July 14, 1964  D. F. WARNER  3,140,987
CHARCOAL RETORT

Filed Sept. 27, 1961  3 Sheets-Sheet 1

INVENTOR:
DONALD F. WARNER,
BY D. Emmett Thompson
HIS ATTORNEY.

July 14, 1964    D. F. WARNER    3,140,987
CHARCOAL RETORT
Filed Sept. 27, 1961    3 Sheets-Sheet 2
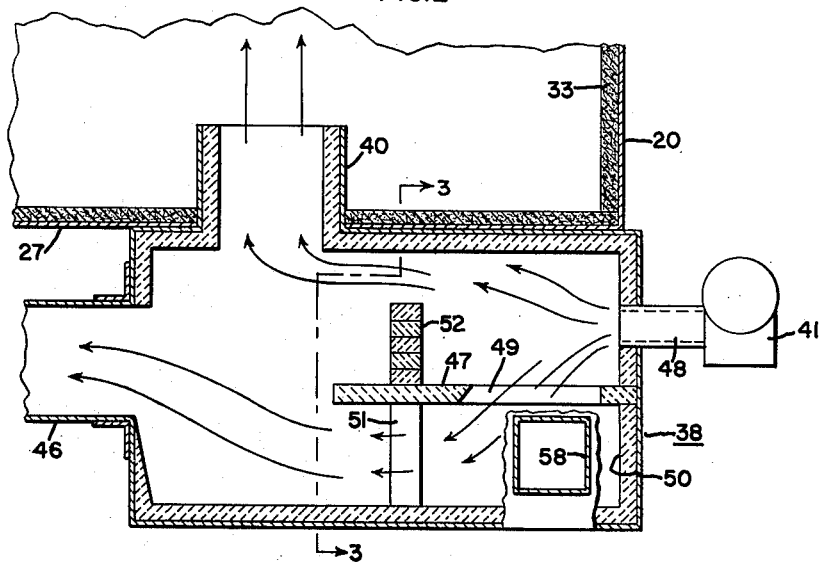
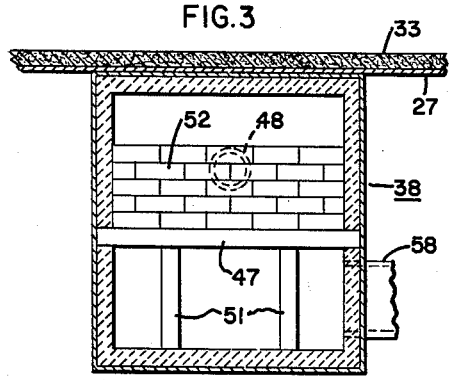
INVENTOR:
DONALD F. WARNER,
BY D. Emmett Thompson
HIS ATTORNEY.

July 14, 1964 D. F. WARNER 3,140,987
CHARCOAL RETORT
Filed Sept. 27, 1961 3 Sheets-Sheet 3
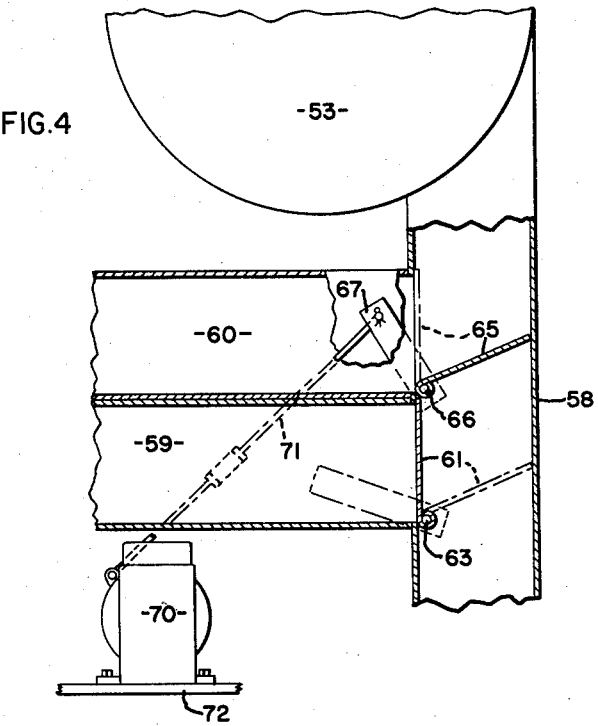
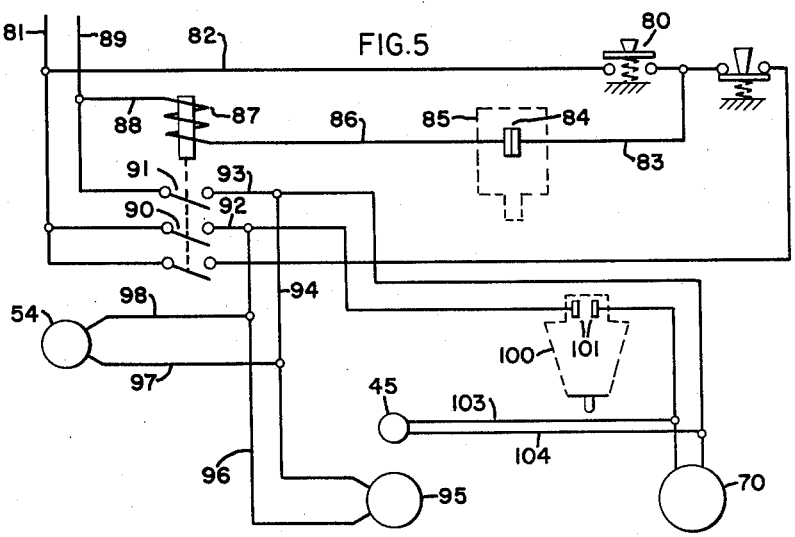
INVENTOR:
DONALD F. WARNER,
BY D. Emmett Thompson
HIS ATTORNEY.

United States Patent Office 3,140,987
Patented July 14, 1964

3,140,987
CHARCOAL RETORT
Donald F. Warner, Speculator, N.Y., assignor to Cyrus J. Cornell and Bickford E. Cornell, doing business as Cornell Manufacturing Co., Lacyville, Pa.
Filed Sept. 27, 1961, Ser. No. 141,192
7 Claims. (Cl. 202—215)

This invention relates to charcoal producing apparatus and has as an object a compact, unitary, retort structure which functions to produce a batch of charcoal of particularly uniform quality with minimum attendance on the part of the operator, the apparatus functioning automatically after the moisture has been driven from the charge of wood in the retort.

The invention further provides for the re-circulation and burning within the retort of the volatile products extracted from the charge of wood.

In describing this invention, reference is had to the accompanying drawings in which like characters designate corresponding parts in all the views.

In the drawings—

FIGURE 2 is a lengthwise sectional view taken through the combustion chamber.

FIGURE 3 is a view taken on line 3—3, FIGURE 2.

FIGURE 4 is an enlarged vertical sectional view of the blower discharge duct and contiguous portions of the branch ducts including the damper arrangement for the latter.

FIGURE 5 is a schematic wiring diagram of the control circuitry.

Figure 1:
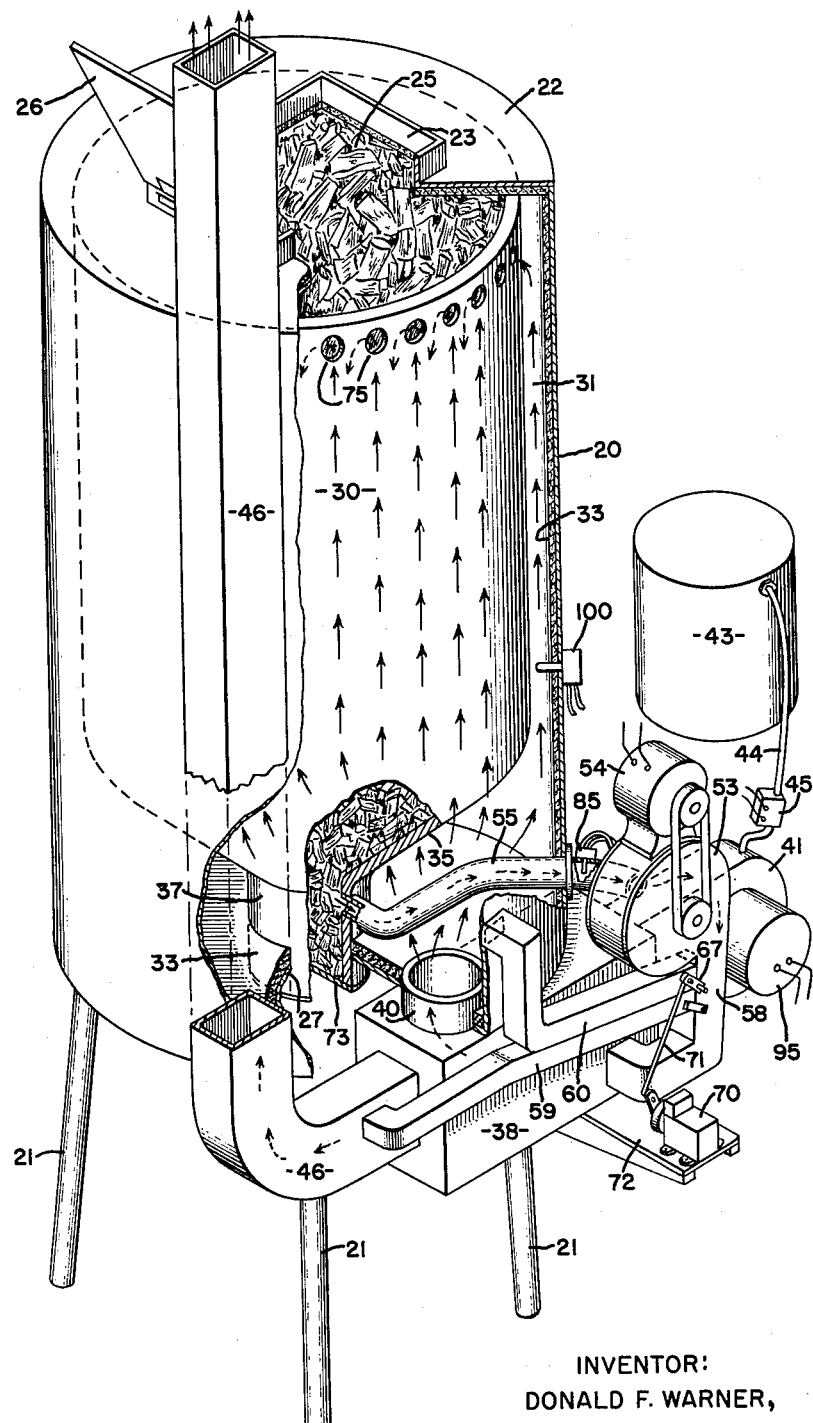
FIGURE 1 is a perspective view of a charcoal retort apparatus embodying my invention with parts broken away and parts shown in section.

The retort proper consists of an outer imperforate shell 20, here shown as of cylindrical formation and being supported on legs 21. The shell 20 is formed with a top wall 22 provided with a rectangular opening 23 to admit the charge of wood 25. This opening is provided with a closure 26. The shell 20 is formed with a substantially flat bottom 27.

An inner shell 30 is mounted within the outer shell 20 and is of less diameter than the latter, providing an annular space 31 between the inner and outer shells. The inner shell 30 is open at the top, or provided with a charge opening in registration with the opening 23 in the outer shell. The outer shell is lined with insulating material, as at 33. The bottom wall 27 of the outer shell is formed with a central opening. The bottom wall 35 of the inner shell is of conical form and has a centrally located depending cylindrical portion 37 extending through the opening in the bottom wall 27 of the outer shell.

A combustion chamber 38 is affixed to the bottom wall 27 of the shell 20. The combustion chamber is of rectangular formation and provided in its top wall with a cylindrical outlet 40 for the discharge of hot gasses into the space 31 between the inner and outer shells. An oil burner 41 is affixed to one end of the combustion chamber to provide heat for dehydrating the wood. The burner is supplied with fuel from a tank 43 through a conduit 44 in which there is mounted a solenoid operated valve 45. A stack 46 is connected to the opposite end of the combustion chamber and extends upwardly exteriorly of the shell 20, see FIGURE 1. A shelf 47 of refractory material is mounted in the combustion chamber and is disposed horizontally a distance below the burner tube 48. The shelf 47 is supported at one end by being embedded in the refractory lining 50, and at its inner end by refractory posts 51. The shelf 47 is formed with one or more slots 49, through which a portion of the flame from the burner is directed to the lower part of the combustion chamber. A baffle 52 is mounted on the shelf 47 and serves to direct the major portion of the flame from the burner upwardly through the discharge 40.

A blower 53 is mounted on the combustion chamber and is operated by a motor 54. The blower is provided with an intake duct 55 connected to the depending portion 37 of the inner shell 30.

The blower is provided with a discharge duct 58 communicating with the interior of the combustion chamber in the area below the shelf 47. There is a branch duct 59 extending from the discharge duct 58 to the stack 46, and a second branch duct 60 extending from the discharge duct 58 to the lower portion of the outer shell 20.

A manually operable damper 61 is mounted at the joinder of the ducts 58, 59. This damper is pivotally mounted, as at 63, and movable from the closed position, illustrated in FIGURE 4, to the open dotted line position.

A damper 65 is provided at the connection between the duct 58 and the branch duct 60, this damper being mounted for movement about the pivot 66 and being operatively connected to an arm 67, mounted exteriorly of the ducts, and connected to a damper operating motor 70 through a link 71, the motor being supported on a bracket 72 attached to the bottom wall of the combustion chamber.

In operation, a charge of wood 25 is placed in the inner shell 30 and the door 26 closed. The charge is retained in the inner shell by a closure 73 detachably affixed to the lower end of the cylindrical portion 37, depending from the bottom wall 35 of the inner shell.

There is communication between the space 31, intermediate the inner and outer shells and the upper portion of the inner shell 30. As shown, the inner shell is formed with a series of apertures 75 extending through the upper portion of the inner shell.

The oil burner 41 is started, together with the blower 53. The hot gases are drawn upwardly through the combustion chamber discharge 40 against the bottom 35 of the inner shell, and are drawn upwardly through the space 31, thence through the aperture 75 and downwardly through the charge of wood.

The burner and blower are started by closing a starting switch 80, see FIGURE 5, providing a circuit from the side 81 of the supply line through wire 82, switch 80, wire 83, closed contacts 84, of a temperature responsive device 85, which is responsive to the temperature in the intake duct 55, thence to wire 86, relay coil 87, wire 88, to the opposite side 89. Relay contacts 90, 91, are connected respectively to the supply 81, 89. These contacts close to supply power to the wires 92, 93. Wire 94 is connected to wire 93 and extends to the oil burner operating motor 95, the opposite side of which is connected to wire 92, through wire 96. Power is also furnished to the blower motor 54 by wires 97, 98, connected respectively to the wires 94, 96.

At the start of the operation, with the burner 95 and blower motor 54 in operation by the closing of the starting switch 80, the dampers 61, 65, are in the dotted line position shown in FIGURE 4—that is, the damper 65 is closed and the damper 61 is open, directing the steam, initially driven from the wood charge 25, through the duct 59 to the stack 46.

When the steam has thus been removed from the charge of wood, the damper 61 is moved to the closed position shown in full line, FIGURE 4. The damper 65 remains closed, and the volatile products now extracted from the wood charge are directed into the lower portion of the combustion chamber and are burned therein by the burner 41 and the products from these burned gases are discharged into the stack 46. This arrangement provides some additional heat from the combustion chamber to the space between the inner and outer shells 20, 30, and prevents the discharge of unburned volatile products passing upwardly through the stack 46.

As this phase of the operation continues, the temperature rises in the space 31 between the inner and outer shells. The temperature is controlled by the temperature responsive device 100 which is set to close its contacts 101 at approximately 750° F. to supply current to the motor 70 through wires 92, 93. When the motor 70 is thus energized, it will operate to move the damper 65 to open full line position, FIGURE 4, and hold the damper in this open position as long as the contacts 101 remain closed. With the damper 65 held in this open position, the volatile products drawn from the inner shell by the blower 53 will be discharged through the branch duct 60 into the lower portion of the outer shell and drawn upwardly through the space 31, and downwardly through the charge of wood in the inner shell. The closing of contacts 101 also provides power through wires 103, 104 to solenoid valve 45 to close the same and cut off the fuel supply to the burner 41, however the burner fan continues to operate. This arrangement prevents excessive temperature rise at the bottom and sidewall of the inner shell 30 which would over-process the wood charge in contact therewith.

As the temperature drops in the space 31, the temperature responsive device 100 will open its contacts 101 releasing the damper 65 for movement to close dotted line position, FIGURE 4, by a spring return mechanism in the motor 70. Damper opening motors of this type may be such as Motor M405B, sold by the Minneapolis-Honeywell Company, Minneapolis, Minn. Also fuel valve 45 will open to again supply fuel to the burner 41 for the operation thereof. With the damper 61 remaining closed, the volatile products will again be directed into the combustion chamber and burn to provide added combustion to again raise the temperature in the space 31. This function of the temperature responsive device 100 and damper motor 70 continues until the gases drawn through inlet duct 55 reach a predetermined temperature, at which time temperature responsive device 85 will open its contacts 84 breaking the hold circuit to relay 87 whereby contacts 90, 91 will open interrupting the power supply to the burner 95 and the blower motor 54. The temperature at which the device 85 operates is in the neighborhood of 540° F., and when these gases reach that temperature the wood charge has been properly converted into charcoal. The charcoal is discharged from the inner shell by removal of the closure 73.

What I claim is:

1. A charcoal producing apparatus comprising imperforate inner and outer shells formed with aligned charging openings at their upper ends and a closure for said openings, said outer shell being formed with a bottom wall having a central aperture, said inner shell being arranged in spaced relation to said outer shell and having a bottom wall inclined downwardly toward the axis of said shells, and having an opening communicating with the central aperture of the bottom wall of said outer shell, a removable closure for said opening, said inner shell being arranged in spaced relation to said outer shell, the space between said outer and inner shells communicating with the interior of said inner shell to the upper end thereof, a combustion chamber mounted externally of said outer shell, a burner connected to said combustion chamber, a discharge passage extending from said combustion chamber through the lower part of said outer shell for the discharge of hot gases from said combustion chamber to the space between said shells, said combustion chamber being provided with an exhaust stack, a blower device having an inlet connected to the bottom wall of said inner shell whereby said blower is operable to draw the hot gases from said combustion chamber upwardly through the space between said inner and outer shells and thence downwardly through the charge in said inner shell, said blower device having a discharge duct extending to said combustion chamber, and damper means operable to connect and disconnect said discharge duct to said combustion chamber.

2. A charcoal producing apparatus comprising imperforate inner and outer shells formed with aligned charging openings at their upper ends and a closure for said openings, said outer shell being formed with a bottom wall having a central aperture, said inner shell being arranged in spaced relation to said outer shell and having a bottom wall inclined downwardly toward the axis of said shells, and having an opening communicating with the central aperture of the bottom wall of said outer shell, a removable closure for said opening, said inner shell being arranged in spaced relation to said outer shell, the space between said outer and inner shells communicating with the interior of said inner shell to the upper end thereof, a combustion chamber mounted externally of said outer shell, a burner connected to said combustion chamber, a discharge passage extending from said combustion chamber through the lower part of said outer shell for the discharge of hot gases from said combustion chamber to the space between said shells, said combustion chamber being provided with an exhaust stack, a blower device having an inlet connected to the bottom wall of said inner shell whereby said blower is operable to draw the hot gases from said combustion chamber upwardly through the space between said inner and outer shells and thence downwardly through the charge in said inner shell, said blower having a discharge duct and damper means operable to alternately connect said discharge duct to said combustion chamber and said stack.

3. A charcoal producing apparatus comprising imperforate inner and outer shells formed with aligned charging openings at their upper ends and a closure for said openings, said outer shell being formed with a bottom wall having a central aperture, said inner shell being arranged in spaced relation to said outer shell and having a bottom wall inclined downwardly toward the axis of said shells, and having an opening communicating with the central aperture of the bottom wall of said outer shell, a removable closure for said opening, said inner shell being arranged in spaced relation to said outer shell, the space between said outer and inner shells communicating with the interior of said inner shell to the upper end thereof, a combustion chamber mounted externally of said outer shell, a burner connected to said combustion chamber, a discharge passage extending from said combustion chamber through the lower part of said outer shell for the discharge of hot gases from said combustion chamber to the space between said shells, said combustion chamber being provided with an exhaust stack, a blower device having an inlet connected to the bottom wall of said inner shell whereby said blower is operable to draw the hot gases from said combustion chamber upwardly through the space between said inner and outer shells and thence downwardly through the charge in said inner shell, said blower having a discharge duct, a branch duct extending from said discharge duct to the lower portion of said outer shell, a damper movable from a first position to a second position, said damper being operable in said first position to connect said discharge duct to said combustion chamber, and in said second position to connect said discharge duct to said branch duct.

4. A charcoal producing apparatus comprising imperforate inner and outer shells formed with aligned charging openings at their upper ends and a closure for said openings, said outer shell being formed with a bottom wall having a central aperture, said inner shell being arranged in spaced relation to said outer shell and having a bottom wall inclined downwardly toward the axis of said shells, and having an opening communicating with the central aperture of the bottom wall of said outer shell, a removable closure for said opening, said inner shell being arranged in spaced relation to said outer shell, the space between said outer and inner shells communicating with the interior of said inner shell to the upper end thereof, a combustion chamber mounted externally of said outer shell, a burner connected to said combustion chamber, a discharge passage extending from said combustion chamber through the lower part of said outer shell for the discharge of hot gases from said combustion chamber to the space between said shells, said combustion chamber being provided with an exhaust stack, a blower device having an inlet connected to the bottom wall of said inner shell whereby said blower is operable to draw the hot gases from said combustion chamber upwardly through the space between said inner and outer shells and thence downwardly through the charge in said inner shell, said blower having a discharge duct extending to said combustion chamber, a first branch duct extending from said discharge duct to the lower portion of said outer shell, a second branch duct extending from said discharge duct to said stack, damper means operable for connecting and disconnecting said discharge duct to said combustion chamber, and separately connecting and disconnecting said branch ducts to said discharge duct.

5. A charcoal producing apparatus comprising imperforate inner and outer shells formed with aligned charging openings at their upper ends and a closure for said openings, said outer shell being formed with a bottom wall having a central aperture, said inner shell having a bottom wall spaced upwardly from the bottom wall of said outer shell and inclining downwardly toward the axis of said shells and having an opening communicating with the central aperture in the bottom wall of said outer shell, a removable closure for said opening, a vertical passageway extending upwardly from the space between the bottom walls of said inner and outer shells and communicating with the interior of said inner shell at the upper end thereof, a combustion chamber, a burner connected to said combustion chamber, a discharge passage extending from said combustion chamber through the bottom wall of said outer shell for the discharge of hot gases from said combustion chamber to the space between the bottom walls of said shells, a blower device having an inlet connected to the bottom wall of said inner shell, whereby said blower is operable to draw hot gases upwardly through said passage and thence downwardly through the charge in said inner shell, said blower device having a discharge duct extending to said combustion chamber, and damper means operable to connect and disconnect said discharge duct to said combustion chamber.

6. A charcoal producing apparatus as defined in claim 5, wherein the outer side wall of said inner shell forms a part of said passageway.

7. A charcoal producing apparatus comprising inner and outer cylindrical shells, a charging opening at the upper ends of said shells for charging the inner shell with wood, a closure for said opening, said outer shell being formed with a flat bottom wall having a central aperture, said inner shell having an inverted conical bottom spaced upwardly from the bottom wall of the outer shell and inclining downwardly toward the axis of said shells and having a central aperture in axial alignment with the central aperture in the bottom wall of the outer shell, a cylindrical member extending downwardly from the aperture in said conical inner bottom wall through the central aperture in the bottom wall of the outer shell, a closure for the lower end of said cylindrical member, a combustion chamber, a burner connected to said combustion chamber, means defining a discharge passage extending from said combustion chamber through the bottom wall of said outer shell for discharge of hot gases from said combustion chamber to the space between the bottom walls of said shells, means formed in part by said outer shell defining a passageway extending upwardly from the space between the bottom walls of said shells and communicating with the interior of said inner shell at the upper end thereof, a blower device having an inlet connected to said cylindrical member, whereby said blower is operable to draw hot gases upwardly from the space between the bottom walls of said shells through said passageway and then downwardly through the wood in said inner shell, said blower device having a discharge duct connected to branch ducts leading, respectively, to said combustion chamber, the space between said bottom walls and an exhaust stack, and damper means for selectively connecting said branch ducts to said discharge duct.

References Cited in the file of this patent
UNITED STATES PATENTS

| | | |
|---|---|---|
| 342,202 | Goodrich | May 18, 1886 |
| 413,306 | Rathbun | Oct. 22, 1889 |
| 863,718 | Jewett | Aug. 20, 1907 |
| 1,684,875 | Malbay | Sept. 18, 1928 |
| 3,090,731 | Keil | May 21, 1963 |